(12) United States Patent
Ewans

(10) Patent No.: US 9,804,268 B2
(45) Date of Patent: Oct. 31, 2017

(54) DISPLAY INSTRUMENTS ALLOWING DISPLAY ORIENTATION ADJUSTMENT

(71) Applicant: John Frayn Ewans, High Wycombe (GB)

(72) Inventor: John Frayn Ewans, High Wycombe (GB)

( * ) Notice: Subject to any disclaimer, the term of this patent is extended or adjusted under 35 U.S.C. 154(b) by 191 days.

(21) Appl. No.: 14/755,201

(22) Filed: Jun. 30, 2015

(65) Prior Publication Data

US 2016/0001868 A1    Jan. 7, 2016

(30) Foreign Application Priority Data

Jul. 1, 2014   (GB) .................................. 1411732.9

(51) Int. Cl.
| | | |
|---|---|---|
| *G08B 23/00* | (2006.01) | |
| *G01S 19/13* | (2010.01) | |
| *B63B 35/71* | (2006.01) | |
| *B63B 49/00* | (2006.01) | |
| *G01S 19/14* | (2010.01) | |
| *B63J 99/00* | (2009.01) | |

(52) U.S. Cl.
CPC .............. *G01S 19/13* (2013.01); *B63B 35/71* (2013.01); *B63B 49/00* (2013.01); *G01S 19/14* (2013.01); *B63J 2099/008* (2013.01)

(58) Field of Classification Search
CPC .......... G01S 19/52; G01S 19/34; G01S 19/13; G01S 19/14; G01S 19/19; B63B 49/00; B63B 35/71; B63H 16/04; B63J 2099/008; G08G 37/00

USPC .......................................................... 340/984
See application file for complete search history.

(56) References Cited

U.S. PATENT DOCUMENTS

| 7,173,569 | B1 | 2/2007 | Smith | |
|---|---|---|---|---|
| 7,207,853 | B2 * | 4/2007 | Spencert | ................. B63B 35/71 440/21 |
| 8,968,041 | B2 * | 3/2015 | Rubbo | ................... B63H 16/04 440/2 |
| 9,274,224 | B2 * | 3/2016 | McCord | ................... G01S 19/52 |
| 2005/0215870 | A1 * | 9/2005 | Rademaker | .............. A61B 5/00 600/301 |
| 2006/0116037 | A1 * | 6/2006 | Squires | ................... B63B 49/00 440/113 |

(Continued)

FOREIGN PATENT DOCUMENTS

WO     2008/073079 A1    6/2008

*Primary Examiner* — John A Tweel, Jr.
(74) *Attorney, Agent, or Firm* — Davis & Bujold PLLC; Michael J. Bujold

(57) ABSTRACT

A display instrument 1 for a coxed rowing boat has a main-body 2 with a display head 3 displaying rowing-related measurements digitally at its front end, and a resilient partially-spherical extension 7 from its rear end. In the assembled instrument 1, the extension 7 is entered into an open-mouth 13 of a cup-receptacle 11 to be gripped resiliently surface-to-surface within a peripheral rim 14 of the mouth 13 so as to resists relative movement but allows manual adjustment of orientation of the main-body 2 relative to the receptacle 11 to facilitate the cox's view of the display. The receptacle 11 is entered in an aperture 16 of a dashboard 17 adjacent the cox's position 18 in the boat, and electronic circuitry of the instrument 1 is receptive of GPS signals to calculate boat and water-stream speeds for display.

10 Claims, 4 Drawing Sheets

(56) References Cited

U.S. PATENT DOCUMENTS

2006/0212271 A1  9/2006  Grenfell et al.
2015/0081062 A1* 3/2015  Fyfe .................... G06F 19/3481
                                                    700/91

* cited by examiner

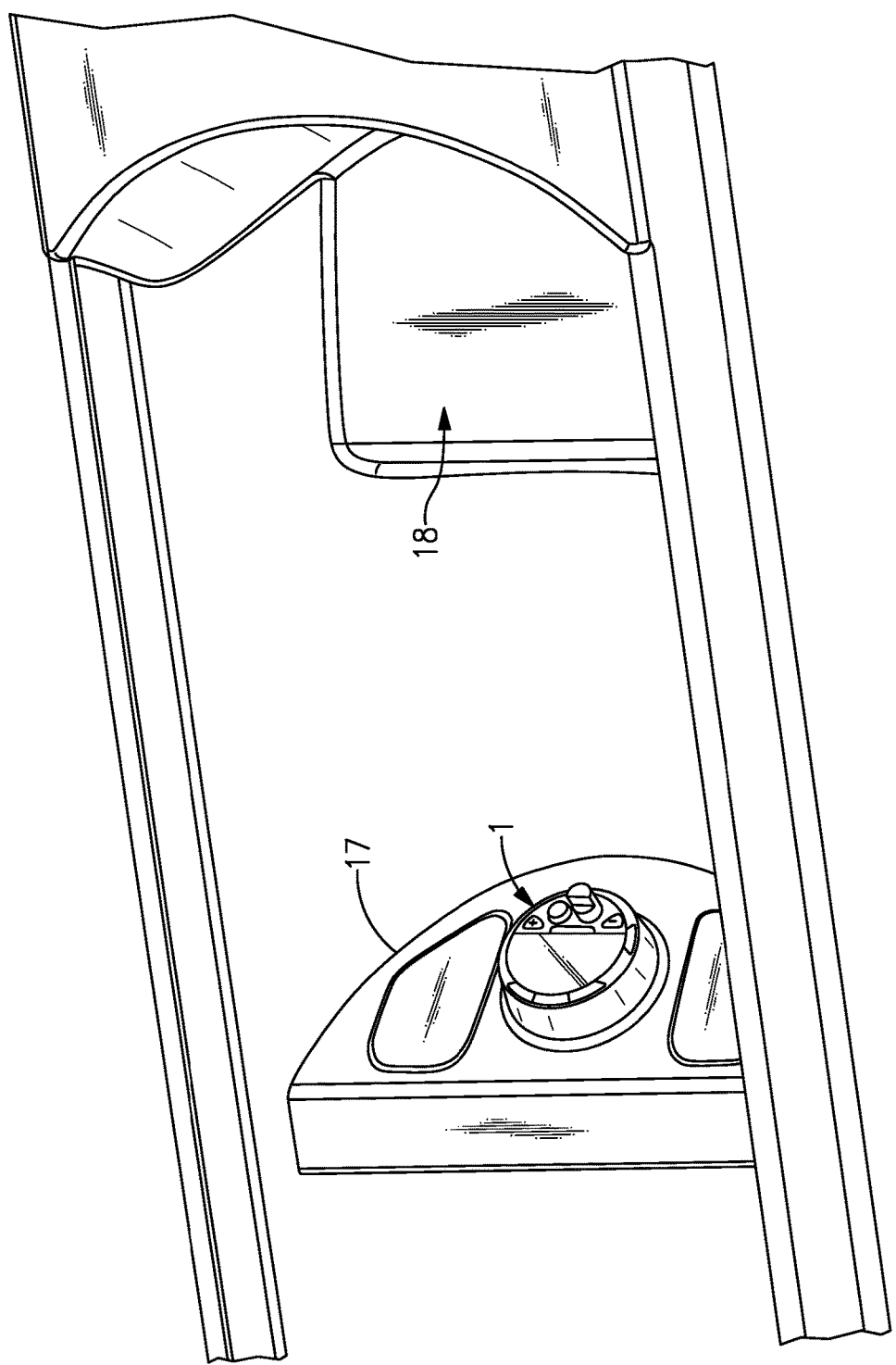

DISPLAY INSTRUMENTS ALLOWING DISPLAY ORIENTATION ADJUSTMENT

This invention relates to display instruments, and is concerned with instruments of this nature that provide displays in digital and/or analogue form.

The invention is especially, but not exclusively, concerned with display instruments for use in coxed rowing boats. It is common in such boats for the cox to communicate information concerning speed, timing and other parameters to the rowers as the boat progresses. This information, or at least some of it, is frequently based on readings taken by the cox from a specialised display instrument located at the cox's position in the boat, and is communicated to the individual rowers primarily by word of mouth, or in many cases via an audio-communications system installed in the boat.

Coxed rowing boats used for racing traditionally include provision of a holder at the cox's position into which the display instrument can be entered for retention and viewing by the cox. A difficulty experienced with the instrument when retained in this way, however, is that it faces towards the cox orientation without allowing any adjustment by him/her for optimum viewing.

It is one of the objects of the present invention to overcome this difficulty to a significant extent, and according to one aspect of the present invention in this regard, there is provided a display instrument for displaying measured variables that comprises a main-body, a display head at a front end of the main-body for displaying the measured variables for viewing, a partially-spherical resilient rear end of the main-body, and a receptacle for holding the main-body, wherein the receptacle has an open mouth defined within a peripheral rim for receiving the resilient rear end of the main-body with surface-to-surface gripping of the rear end by the rim allowing adjustment of the orientation of the display head relative to the receptacle.

The receptacle may be a cylindrical cup which in the context of use in a coxed rowing boat may fit within an aperture in an inclined dashboard mounted athwartships of the cox's position. The adjustability of the orientation of the instrument according to the invention enables the cox to maintain an optimum orientation of the instrument for viewing at all times.

The display instrument may include electronic circuitry receptive of GPS (global positioning signals) for calculation and display, for example, of the speed and direction of the rowing boat. More especially, a calculation may be of the speed of the boat through the water and may be derived from two GPS readings of speed, one the speed of the boat during rowing and the other the speed of the water stream within which the boat is being rowed. The speed of the water stream may be calculated using a reading of the speed of the boat during a period when rowing is absent but the oars of the boat are held in the water with their blades square to the water stream. GPS gives the magnitude and direction of the speed in both cases relative to land, so the magnitude of the speed of the boat through the water is the sum of the magnitudes of the two GPS speeds when the boat is headed against the stream, whereas it is the difference of them when the boat is headed with the stream.

According to a feature of the present invention there is provided a display instrument for a cox of a rowing boat, wherein the display instrument comprises electronic circuitry receptive of global positioning signals (GPS) for deriving from the global-positioning signals a magnitude of speed of movement of the rowing boat, a main body, a display head at a front end of the main-body for displaying the magnitude of speed derived by the electronic circuitry for viewing by the cox, a partially-spherical resilient rear end of the main-body, and receptacle for holding the main-body, wherein the receptacle has an open mouth defined within a peripheral rim for receiving the resilient rear end of the main-body with surface-to-surface gripping of the rear end of the main-body by the rim allowing adjustment of the orientation of the display head relative to the receptacle.

A display instrument that is in accordance with the present invention, will now be described, by way of example, with reference to the accompanying drawings, in which:

FIG. 4 is a plan view of part of the rowing boat showing the cox's position and adjacent location of the mounted display instrument within the boat.

Figure 1:
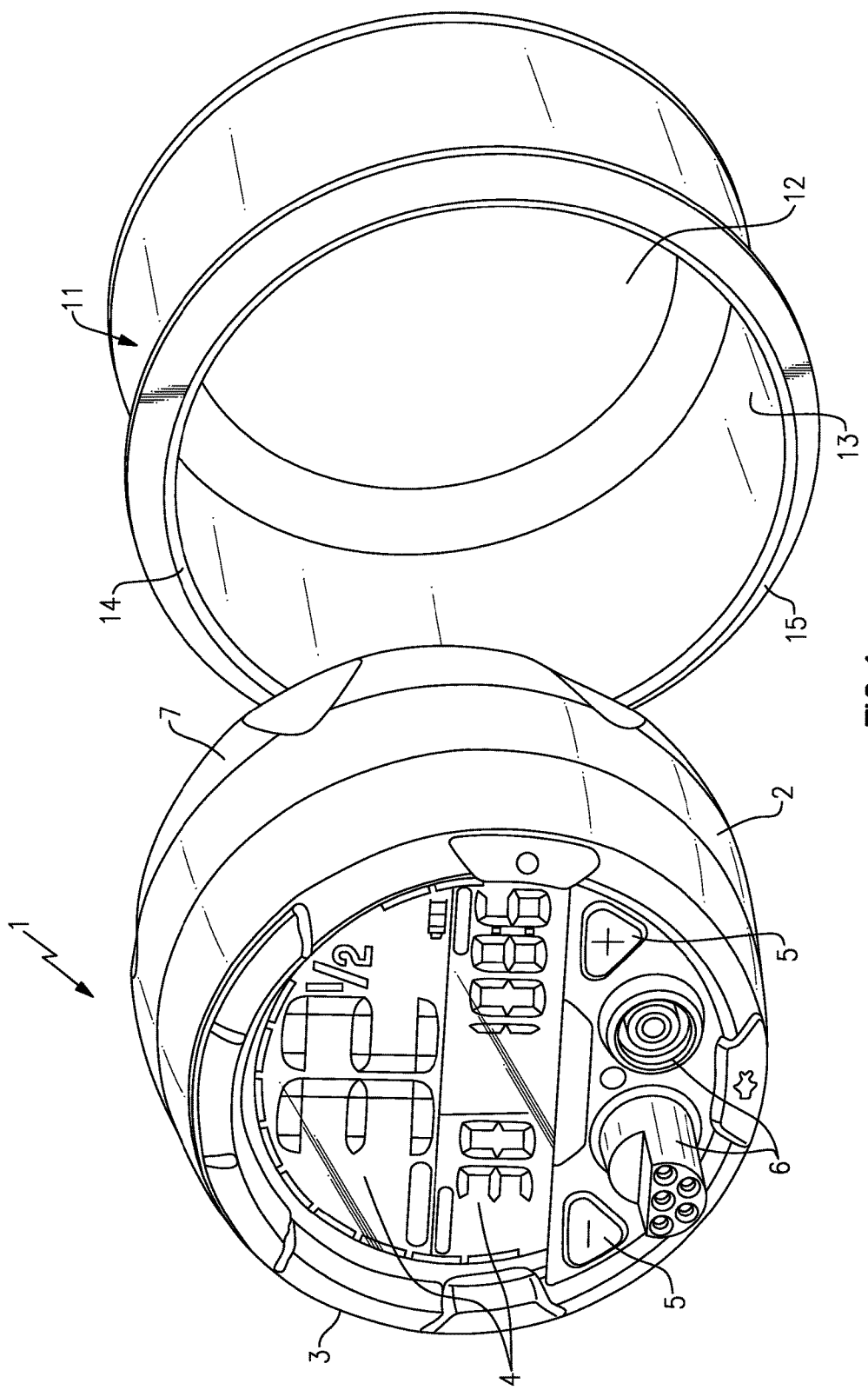
FIGS. 1 and 2 are respectively a perspective view and a side elevation of the display instrument with its component receptacle detached.
Figure 2:
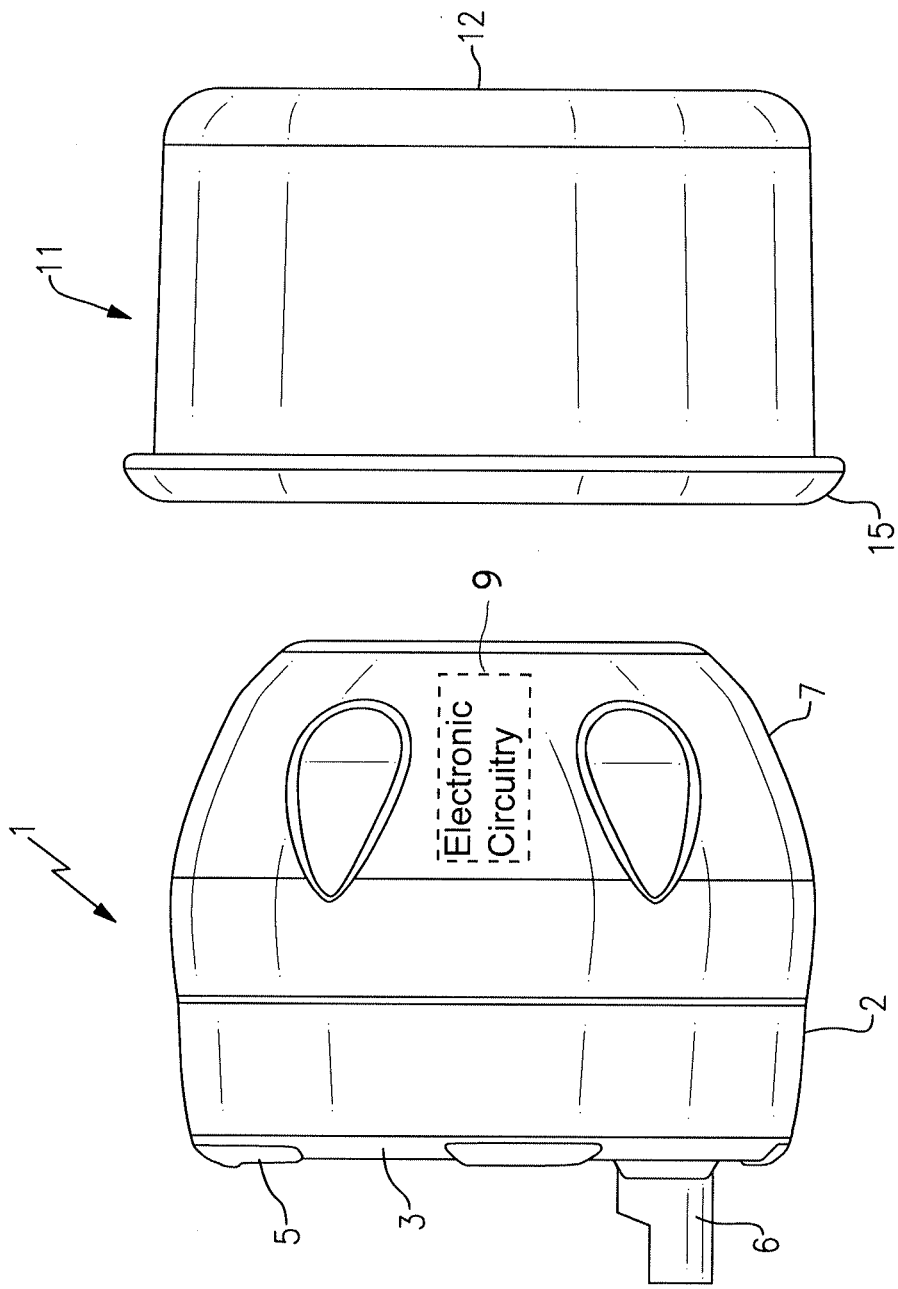
Figure 3:
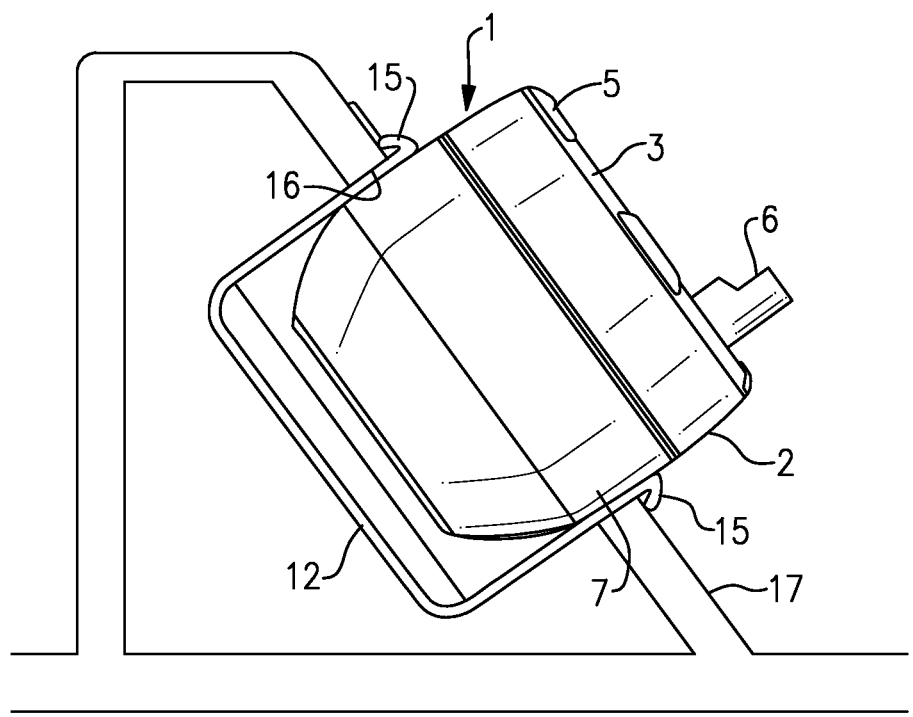
FIG. 3 is a sectional side elevation of the mounting of the assembled display instrument of the invention, in a coxed rowing boat.

Referring to FIGS. 1 to 3, the display instrument 1 has a partially-cylindrical main-body with a display head 3 at its front end for providing digital displays 4 of various rowing-related functions such as stroke rate, stroke counts, elapsed time and speeds. The display head 3 also in push-buttons 5 for controlling and selecting the parameters displayed, together with plug-in connections 6 for microphone input and speaker output of an audio-communications system of the boat.

The main-body 2 has a partially-spherical extension 7 at its rear end that in the assembled instrument 1 engages within a receptacle 11 for holding the instrument 1 with an adjustable orientation. The adjustability enables the cox to move the instrument 1 into the optimum orientation for viewing the display head 3.

The receptacle 11 for holding the instrument 1 is formed as a cylindrical cup with a closed base 12 and an open mouth 13. The mouth 13 is defined within a peripheral rim 14 that has an outwardly folded-over lip 15, and in assembling the instrument 1 the partially-spherical extension 7 is entered through the rim into the mouth 13. The extension 7 has a resilience that enables it to be squeezed within the cup 11 (as illustrated in FIG. 3) to the extent that it is gripped resiliently surface-to-surface within the rim 14. The resilience of this gripping within the partially-spherical extension 7, however, acts to retain the instrument 1 in the orientation to which it is set yet allows its orientation relative to the cup 11 to be readily adjusted by hand.

In mounting the instrument 1 in the boat for viewing by the cox, the instrument 1 is entered rearwardly (that is to say, with the base 12 of the cup-receptacle 1 leading) through an aperture 16 in a dashboard 17 until, as illustrated in FIG. 3, further entry is blocked by abutment of the outwardly folded-over lip 15 with the dashboard 17.

Referring now particularly to FIG. 4, the dashboard 17 is mounted athwartships just in front of the cox's position 18 in the boat. This enables the cox to view the display provided by the display head 3 of the instrument 1 and readily make manually whatever adjustments to its orientation are required for optimum viewing throughout his/her control of the boat. Once adjustment of orientation has been made, the instrument 1 is retained firmly in that orientation by the resilience of the gripping on the extension 7 by the rim 14, until further adjustment is made by hand.

The instrument 1, which includes an audio amplifier for the communications system of the boat together with an accelerometer for deriving stroke rates, is receptive of GPS for the calculation and digital display at the head 3 of the speed and direction of the rowing boat. In this respect, the main-body 2 of the instrument 1 includes electronic circuitry 9 (FIG. 2) for deriving readings of GPS positions and calculation of the speed of the boat through the water. Two GPS readings are taken by the circuitry, one of the speed of the boat during rowing and the other of the speed of the water stream. GPS gives the magnitude and direction of the speed in both cases relative to land, and the magnitude of the speed of the boat through the water is the sum of the magnitudes of the two GPS speeds of the boat when the boat is headed against the stream, whereas it is the difference between them when the boat is headed with the stream. The speed of the water stream is taken when there is no rowing of the boat but the blades of the oars are held in the water square to the water stream.

The invention claimed is:

1. A display instrument for displaying measured variables, comprising a main-body, a display head at a front end of the main-body for displaying the measured variables for viewing, a partially-spherical resilient rear end of the main-body, and a receptacle for holding the main-body, wherein the receptacle has an open mouth defined within a peripheral rim for receiving the resilient rear end of the main-body with surface-to-surface gripping of the rear end by the rim allowing adjustment of orientation of the display head relative to the receptacle.

2. The display instrument according to claim 1 wherein the receptacle is a cylindrical cup.

3. The display instrument according to claim 1 wherein the display head displays the measured variables digitally.

4. The display instrument according to claim 1 wherein the display instrument includes electronic circuitry receptive of global-positioning signals (GPS) for deriving from the global-positioning signals a reading of speed of movement of the instrument for display by the display head.

5. The display instrument for a cox of a rowing boat, wherein the display instrument comprises electronic circuitry receptive of global-positioning signals (GPS) for deriving from the global-positioning signals a magnitude of speed of movement of the rowing boat, a main-body, a display head at a front end of the main-body for displaying for viewing by the cox the magnitude of speed derived by the electronic circuitry, a partially-spherical resilient rear end of the main-body, and a receptacle for holding the main-body, wherein the receptacle has an open mouth defined within a peripheral rim for receiving the resilient rear end of the main-body with surface-to-surface gripping of the rear end of the main-body by the rim allowing adjustment of the orientation of the display head relative to the receptacle.

6. The display instrument according to claim 5 wherein the receptacle is a cylindrical cup.

7. The display instrument according to claim 5 wherein the electronic circuitry is receptive of the global-positioning signals (GPS) for deriving a first magnitude of speed of movement of the rowing boat during rowing and a second magnitude of speed of movement of the rowing boat in water during the absence of rowing, and wherein the electronic circuitry calculates a speed of water stream from the first and second magnitudes of speed.

8. The display instrument according to claim 7 wherein the second magnitude of speed of movement of the rowing boat is calculated in the absence of rowing with blades of the oars of the rowing boat held square to water flow.

9. The display instrument according to claim 5 wherein the display head displays the magnitude of speed of movement of the rowing boat, digitally.

10. A coxed rowing boat having a cox's position, a dashboard mounted in the boat adjacent the cox's position, and a display instrument comprising a main-body, a display head at a front end of the main-body for displaying measured variables for viewing from the cox's position, a partially-spherical resilient rear end of the main-body, and a receptacle for mounting on the dashboard, wherein the receptacle has an open mouth defined within a peripheral rim for receiving the resilient rear end of the main-body with surface-to-surface gripping of the rear end by the rim allowing adjustment of orientation of the display head relative to the cox's position to facilitate viewing of the display head from the cox's position.

\* \* \* \* \*